US011136697B2

(12) United States Patent
Minor et al.

(10) Patent No.: US 11,136,697 B2
(45) Date of Patent: Oct. 5, 2021

(54) FABRICS CONTAINING CONFORMABLE LOW DENSITY FLUOROPOLYMER FIBER BLENDS

(71) Applicant: W. L. Gore & Associates, Inc., Newark, DE (US)

(72) Inventors: David J. Minor, Elkton, MD (US); Norman E. Clough, Landenberg, PA (US); Raymond B. Minor, Elkton, MD (US)

(73) Assignee: W. L. Gore & Associates, Inc., Newark, DE (US)

( * ) Notice: Subject to any disclaimer, the term of this patent is extended or adjusted under 35 U.S.C. 154(b) by 12 days.

(21) Appl. No.: 15/070,568

(22) Filed: Mar. 15, 2016

(65) Prior Publication Data
US 2016/0273134 A1    Sep. 22, 2016

Related U.S. Application Data

(60) Provisional application No. 62/133,525, filed on Mar. 16, 2015.

(51) Int. Cl.
*D03D 15/00* (2021.01)
*B32B 5/08* (2006.01)
(Continued)

(52) U.S. Cl.
CPC ........... *D03D 15/00* (2013.01); *A41D 31/102* (2019.02); *B32B 3/26* (2013.01); *B32B 5/022* (2013.01);
(Continued)

(58) Field of Classification Search
CPC ............ B32B 2307/728; B32B 27/322; B32B 2307/72; B32B 27/205; B32B 2307/724;
(Continued)

(56) References Cited

U.S. PATENT DOCUMENTS 3,953,566 A * 4/1976 Gore .............. B01D 71/36
264/505
4,194,041 A * 3/1980 Gore .............. B32B 27/08
442/289
(Continued)

FOREIGN PATENT DOCUMENTS

CN         1639296 A     7/2005
CN       102317519 A     1/2012
(Continued)

OTHER PUBLICATIONS

"Explained: Hydrophobic and hydrophilic", David L. Chandler, MIT News Office, http://news.mit.edu/2013/hydrophobic-and-hydrophilic-explained-0716 Jul. 16, 2013. (Year: 2013).*
(Continued)

*Primary Examiner* — Jennifer A Gillett

(57) ABSTRACT

Fabrics containing hydrophilic expanded polytetrafluoroethylene (ePTFE) fibers and at least one non-ePTFE fiber are provided. The fabric provides a combination of high breathability and controlled moisture management. In exemplary embodiments, the fabric may be a woven, knit, or fleece fabric. The fabrics contain at least 15% ePTFE fibers based on the final fabric. The hydrophilic ePTFE fibers in the fabrics may be used to control moisture such as water vapor, liquid water, or sweat within the fabric by storing the moisture within the hydrophilic ePTFE fiber network. Also, little to none of the moisture remains on the outside of the hydrophilic ePTFE fibers, making the fabric feel dry even where there is moisture therein. A polymer membrane and/or a textile may be laminated to the fabric to produce a laminated article.

34 Claims, 5 Drawing Sheets

(51) Int. Cl.

| | |
|---|---|
| *B32B 5/02* | (2006.01) |
| *B32B 5/16* | (2006.01) |
| *A41D 31/102* | (2019.01) |
| *B32B 27/12* | (2006.01) |
| *B32B 3/26* | (2006.01) |
| *D04B 1/26* | (2006.01) |
| *B32B 27/20* | (2006.01) |
| *B32B 27/40* | (2006.01) |
| *B32B 7/12* | (2006.01) |
| *B32B 27/36* | (2006.01) |
| *B32B 27/32* | (2006.01) |
| *D03D 15/44* | (2021.01) |
| *D01D 5/247* | (2006.01) |
| *D01F 6/12* | (2006.01) |
| *D03D 15/46* | (2021.01) |
| *D01F 1/06* | (2006.01) |

(52) U.S. Cl.
CPC .............. *B32B 5/024* (2013.01); *B32B 5/026* (2013.01); *B32B 5/08* (2013.01); *B32B 5/16* (2013.01); *B32B 7/12* (2013.01); *B32B 27/12* (2013.01); *B32B 27/205* (2013.01); *B32B 27/32* (2013.01); *B32B 27/322* (2013.01); *B32B 27/36* (2013.01); *B32B 27/40* (2013.01); *D01D 5/247* (2013.01); *D01F 6/12* (2013.01); *D03D 15/44* (2021.01); *D03D 15/46* (2021.01); *D04B 1/26* (2013.01); *A41B 2400/22* (2013.01); *B32B 2255/02* (2013.01); *B32B 2255/10* (2013.01); *B32B 2262/0215* (2013.01); *B32B 2262/0246* (2013.01); *B32B 2262/0261* (2013.01); *B32B 2262/0269* (2013.01); *B32B 2262/062* (2013.01); *B32B 2262/08* (2013.01); *B32B 2262/14* (2013.01); *B32B 2264/0257* (2013.01); *B32B 2307/4023* (2013.01); *B32B 2307/4026* (2013.01); *B32B 2307/546* (2013.01); *B32B 2307/554* (2013.01); *B32B 2307/5825* (2013.01); *B32B 2307/718* (2013.01); *B32B 2307/72* (2013.01); *B32B 2307/724* (2013.01); *B32B 2307/726* (2013.01); *B32B 2307/728* (2013.01); *B32B 2307/75* (2013.01); *B32B 2437/00* (2013.01); *D01F 1/06* (2013.01); *D10B 2321/042* (2013.01); *D10B 2401/022* (2013.01); *D10B 2501/00* (2013.01)

(58) Field of Classification Search
CPC ........ B32B 2307/726; D10B 2401/022; D10B 2321/042; D01F 6/12; D01D 5/247; A41D 2400/22; A41B 2400/22
USPC .......................................... 442/195, 181, 304
See application file for complete search history.

(56) References Cited

U.S. PATENT DOCUMENTS

| | | | | |
|---|---|---|---|---|
| 4,954,388 | A * | 9/1990 | Mallouk | B01D 69/10 204/295 |
| 5,262,234 | A | 11/1993 | Minor et al. | |
| 5,571,605 | A * | 11/1996 | Abrams | D01F 6/12 139/383 B |
| 5,708,044 | A | 1/1998 | Branca | |
| 6,103,641 | A * | 8/2000 | Gehring, Jr. | B32B 5/26 442/46 |
| 6,541,589 | B1 | 4/2003 | Baillie | |
| 7,531,611 | B2 | 5/2009 | Sabol et al. | |
| 8,637,144 | B2 | 1/2014 | Ford | |
| 9,139,669 | B2 | 9/2015 | Xu et al. | |
| 9,415,193 | B2 * | 8/2016 | Campbell | A61M 25/10 |
| 2002/0045931 | A1 * | 4/2002 | Sogard | A61F 2/07 623/1.13 |
| 2005/0149173 | A1 * | 7/2005 | Hunter | A61B 17/11 623/1.42 |
| 2006/0009835 | A1 * | 1/2006 | Osborne | A61F 2/06 623/1.13 |
| 2006/0182962 | A1 * | 8/2006 | Bucher | D02G 3/047 428/364 |
| 2007/0012624 | A1 * | 1/2007 | Bacino | B01D 39/1692 210/650 |
| 2008/0011676 | A1 * | 1/2008 | Olson | B01D 67/0088 210/500.36 |
| 2009/0255038 | A1 * | 10/2009 | Curtis | A41D 27/02 2/455 |
| 2010/0159766 | A1 * | 6/2010 | Clough | D03D 15/00 442/181 |
| 2010/0255270 | A1 * | 10/2010 | Stuebiger | B32B 5/02 428/201 |
| 2010/0287680 | A1 * | 11/2010 | Johnson | A41D 31/02 2/87 |
| 2010/0288321 | A1 * | 11/2010 | Dwyer | E04H 15/54 135/115 |
| 2011/0129657 | A1 * | 6/2011 | Clough | B32B 5/024 428/219 |
| 2014/0212612 | A1 | 7/2014 | Sbriglia | |
| 2014/0273698 | A1 | 9/2014 | Woodruff et al. | |
| 2015/0252522 | A1 | 9/2015 | Setoguchi et al. | |
| 2016/0031130 | A1 | 2/2016 | Sbriglia | |
| 2016/0032044 | A1 | 2/2016 | Sbriglia et al. | |
| 2016/0032069 | A1 | 2/2016 | Sbriglia | |
| 2016/0032071 | A1 | 2/2016 | Sbriglia et al. | |

FOREIGN PATENT DOCUMENTS

| | | |
|---|---|---|
| CN | 103764885 A | 4/2014 |
| CN | 103781544 A | 5/2014 |
| JP | H9-501995 A | 2/1997 |
| JP | H10-46427 A | 2/1998 |
| JP | 2004-244787 A | 9/2004 |
| JP | 2013-544985 A | 12/2013 |
| RU | 2469132 | 12/2012 |
| WO | WO2013151950 | 10/2013 |
| WO | WO2015195598 | 12/2015 |

OTHER PUBLICATIONS

Insulate, Defintion of Insulate, Meeriam-Webster, www.merriam-webster.com/dictionary/insulate, retrieved Nov. 25, 2019.*
International Search Report PCT/US2016/022537 dated Jul. 27, 2016.

* cited by examiner

FABRICS CONTAINING CONFORMABLE LOW DENSITY FLUOROPOLYMER FIBER BLENDS

FIELD

The present disclosure relates generally to fabrics, and more specifically to a fabric that includes blends of conformable low density fluoropolymer fiber, such as expanded polytetrafluoroethylene (ePTFE) fibers and at least one other fiber. The fabric is breathable, drapable, durable, and demonstrates improved liquid and moisture vapor management, including improved sweat management.

BACKGROUND

Moisture management clothing is known in the art. Fabrics are typically knitted or woven from yarns to form articles such as socks, shirts, underwear, and the like. Typical yarn materials used are generally either manmade or natural yarns, or combinations thereof. Popular natural materials typically include wool, cotton, and silk. Popular manmade materials typically include rayon, polyester, polypropylene, polyamide, acrylic, spandex, aramid, and combinations thereof. In addition, these fibers and/or articles of clothing may be treated to create either hydrophilic or hydrophobic surfaces, or combinations thereof.

It is also known that comfort is an important parameter of clothing. This includes balancing the psychological, sensorial, thermal, and moisture conditions for the user. Ideally, fabrics would exhibit comfort over a wide range of conditions, so as to eliminate the negative attributes associated with discomfort. These attributes typically include protection against discomfort from feeling cold, hot, damp, sticky, or sweaty, enough so that the users take particular notice to recognize it as uncomfortable.

It is known in the art that each natural and manmade fiber has benefits and drawbacks, particularly when utilized in activities that include an active portion (changing sweat rates) or varying environmental conditions (changing humidity or temperature, encountering wind, sun, shade, or rain). These fibers are chosen for an application based upon a combination of attributes, some important parameters include the drapability or softness off the fabric, as well as how it manages sweat (vapor and liquid) coming from the body.

Current solutions do not address these needs to the user's desired extent. For example, merino wool fabrics are soft, drapable, and provide a high capacity for moisture vapor absorption within the inner portion of the fiber, keeping the user fairly comfortable in changing conditions. However, these fabrics are not very mechanically durable, and in periods of high activity or humidity, once the wool fills with absorbed vapor, there is little capacity in the wool yarn bundles for condensation or liquid management, thus making the user feel wet when not desired. The high absorption of the wool in addition to excess liquid can result in heavy clothing, and long periods of dampness or long dry times, particularly in humid environments when the wool cannot readily desorb the absorbed moisture. Polyester fabrics have an ability to remain durable, lightweight, and dry fast in most environments, but these fabrics have negligible vapor absorption, and not enough capacity for moisture vapor adsorption and/or condensation to prevent feeling cold, hot, or sweaty earlier than desired. These fabrics also feel wet with a very low level of liquid added to the item, creating sensations of wetness and/or coldness when not desired.

There is a need in the art for clothing that is soft, maintains a suitable life (durability), while also widening the range in which the user can remain comfortable. Articles of clothing as described herein may include any articles worn by an individual, and may also include those articles coming into contact with an individual, such as sheets, blankets, sleeping bags and the like.

Therefore, there is need in the art to provide fabrics that have an overall comfort to the wearer with respect to touch and feel, warmth, moisture management and aesthetics, including a high capacity for moisture vapor adsorption and condensation, and a high capacity for liquid in a defined volume, while maintaining a soft and durable fabric with a good visual aesthetic.

SUMMARY

The invention is directed, in one embodiment, to articles of clothing incorporating a fabric that includes (1) a plurality of low density, hydrophilic fibers having a microstructure of an interconnected network of fibrils, with either inherent hydrophilicity, or high surface area to allow coating or treatment to impart hydrophilic nature to the fibers, and typically having a density less than about 1.2 g/cm$^3$; and (2) a plurality of other fibers. The other fibers may include rayon, polyester, polyethylene, polypropylene, cotton, wool, silk, aramid, polyamide, acrylic, olefin, spandex, and combinations thereof. In one embodiment, the fabric may contain at least about 15% by weight of the low density, hydrophilic fibers. These low density, hydrophilic fibers may have any suitable geometry and aspect ratio appropriate for the end use contemplated. In one alternative embodiment, the low density, hydrophilic fibers may have a substantially rectangular configuration (e.g., aspect ratio greater than 1) or a substantially round configuration (e.g. aspect ratio of about 1). The fabrics may be woven or knitted in nature. In one embodiment, A textile and/or a polymer membrane may be affixed to at least one side of the fabric.

A second embodiment of the invention relates to a fabric that includes (1) a plurality of hydrophilic, expanded polytetrafluoroethylene fibers (ePTFE) fibers having a density less than about 1.2 g/cm$^3$ and (2) a plurality of non-ePTFE fibers. The non-ePTFE fibers may include rayon, polyester, polyethylene, polypropylene, cotton, wool, silk, aramid, polyamide, acrylic, olefin, spandex, and combinations thereof. In one embodiment, the fabric may contain at least about 15% by weight ePTFE fibers. The fibers may have any suitable geometry and aspect ratio appropriate for the end use contemplated. In one alternative embodiment, the ePTFE fibers may have a substantially rectangular configuration (e.g., aspect ratio greater than 1) or a substantially round configuration (e.g. aspect ratio of about 1). In one embodiment, A textile and/or a polymer membrane may be affixed to at least one side of the fabric.

A third embodiment of the invention relates to a woven fabric that includes (1) a plurality of warp and weft fibers where at least some of the fibers in at least one of the warp or weft directions include at least one hydrophilic, expanded polytetrafluoroethylene (ePTFE) fiber having a density less than about 1.2 g/cm$^3$ and (2) a plurality of non-PTFE fibers. In one embodiment, the woven fabric includes at least 15% by weight ePTFE fibers. The ePTFE fibers may have a substantially rectangular configuration (e.g., aspect ratio greater than 1) or a substantially round configuration (e.g. aspect ratio of about 1). The non-ePTFE fibers may include rayon, polyester, polyethylene, polypropylene, cotton, wool, silk, aramid, polyamide, acrylic, olefin, spandex, and combinations thereof.

A fourth embodiment of the invention relates to a knit fabric that includes (1) a plurality of hydrophilic expanded polytetrafluoroethylene (ePTFE) fibers having a density less than about 1.2 g/cm$^3$ and (2) a plurality of non-ePTFE fibers. The non-ePTFE fibers may include rayon, polyester, polyethylene, polypropylene, cotton, wool, silk, aramid, polyamide, acrylic, olefin, spandex, and combinations thereof. The ePTFE fibers are present in the knit fabric in an amount of at least 15% by weight. The hydrophilic ePTFE fibers may have a substantially rectangular configuration (e.g., aspect ratio greater than 1) or a substantially round configuration (e.g. aspect ratio of about 1).

A fifth embodiment of the invention relates to an article that includes (1) hydrophilic ePTFE fibers and (2) non-ePTFE fibers where the hydrophilic fibers and non-ePTFE fibers are formed into a fabric. The non-ePTFE fibers may be selected from rayon, polyester, polyethylene, polypropylene, cotton, wool, silk, aramid, polyamide, acrylic, olefin, spandex and combinations thereof. In one embodiment, the ePTFE fibers may contain therein at least one insulative material. The ePTFE fiber may contain therein at least one colorant material. In another embodiment of the invention, the ePTFE fiber may contain therein at least one material exhibiting a high index of refraction. In at least one embodiment, the fabric contains at least about 15% by weight ePTFE fibers. The fabric exhibits a vertical wicking of greater than 10 mm in 10 mins. The ePTFE fibers may has an aspect ratio greater than 1 and have a substantially rectangular configuration. In another embodiment, the ePTFE fibers may have an aspect ratio of about 1 and be substantially round in configuration.

In another embodiment of the invention, the ePTFE fiber is positioned within a fabric structure so that the ePTFE fiber does not protrude, or protrudes in only a limited manner, on either surface of the fabric. Since this ePTFE fiber has inherent low friction, in certain end uses it is desired to not affect attributes such as "friction" or "traction." This is particularly relevant in socks and footwear where initial traction is paramount. In these such applications, the benefits from the ePTFE fiber structure may be imparted when not in physical contact with the user, but instead when incorporated within the fabric structure. In this embodiment, the ePTFE fiber improves fabric attributes such as drape, durability, and moisture management, which is important for maintaining healthy feet, yet facilitates good traction for the wearer. Alternatively, for embodiments where at least some low friction performance is desired, the exposure of the ePTFE fiber may be tailored within the fabric weave or knit structure to provide this effect.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

GLOSSARY

Figure 1:
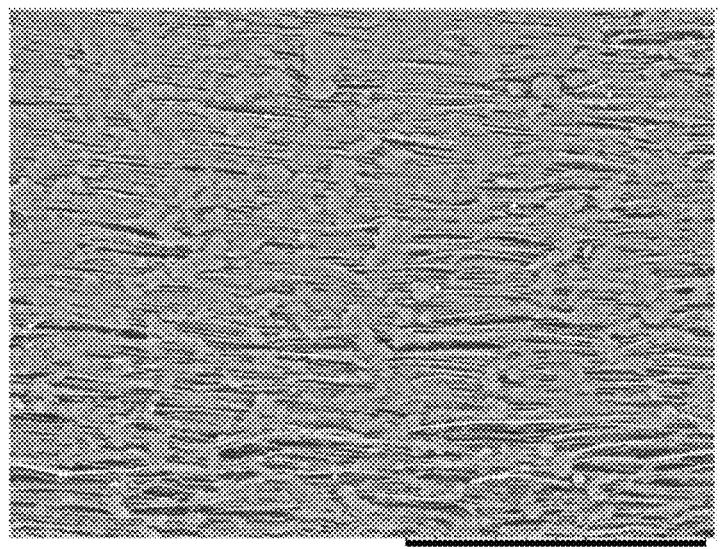
FIG. 1 is a scanning electron micrograph (SEM) of the top surface of a hydrophilic ePTFE fiber taken at 1000× according to an embodiment of the invention.

As used herein, the term "amorphously locked" is meant to denote that the polytetrafluoroethylene (PTFE) material has been heated above the crystalline melt temperature of the PTFE.

The term "low density fiber" or "low density ePTFE fiber" as used herein are meant to describe fibers that have a pre-weaving or pre-knitting density less than about 1.0 g/cm$^3$.

As used herein, the terms "high density fiber" or "high density ePTFE fiber" are meant to describe fibers that have a pre-weaving or pre-knitting density greater than about 1.9 g/cm$^3$.

The term "conformable" and "conformable fiber" as used herein are meant to describe fibers that are capable of curling and/or folding upon themselves to conform to the weave or knit spacing. In woven fabrics, this is provided between the crossovers of the warp and weft fibers and as determined by the number of picks per inch and/or ends per inch of the warp and weft fibers. In knit fabrics, this is provided by the loops and turns in knit patterns.

"Microporous" is defined herein as having pores that are not visible to the naked eye.

As used herein, the terms "breathable" and "breathability" refer to ePTFE fabrics that have a moisture vapor transmission rate (MVTR) of at least about 3000 grams/m$^2$/24 hour.

The term "substantially rectangular configuration" as used herein is meant to denote that the ePTFE fibers have a rectangular or nearly rectangular cross section, with or without a rounded or pointed edge (or side) and an aspect ratio greater than 1.

The term "substantially round" as used herein is meant to denote that the ePTFE fibers have a round or nearly round configuration and an aspect ratio of the ePTFE fibers of about 1.

The term "fabric" as used herein is meant to include any woven. nonwoven, felt, fleece, or knit that includes hydrophilic ePTFE fibers and at least one non-PTFE fiber.

As used herein, the term "textile" is meant to denote any woven, nonwoven, felt, fleece, or knit and can be composed of natural and/or synthetic fiber materials and/or other fibers or flocking materials.

The terms "weave fiber" and "knit fiber" as used herein are meant to denote the non-ePTFE fiber(s) that are woven or knit with the hydrophilic ePTFE fiber to form a woven or knit fabric, respectively.

As used herein, the term "dry" is meant to denote dry weight at standard conditions.

The term "plurality" as used herein is meant to denote one or more of a particular fiber.

The term "on" as used herein is meant to denote that when an element is "on" another element, it can be directly on the other element or intervening elements may also be present.

The terms "adjacent" and "adjacent to" as used herein are meant to denote that when an element is "adjacent" to another element, the element may be directly adjacent to the other element or intervening elements may be present.

DETAILED DESCRIPTION

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

The present invention relates to fabrics that contain hydrophilic, conformable expanded polytetrafluoroethylene (ePTFE) fibers and at least one other non-ePTFE fiber. The fabric may be, for example, a woven, knit, or fleece fabric. The ePTFE fiber may be woven or knit as a single fiber or as part of a multifilament fiber. The fabric provides a combination of high breathability (high moisture vapor transmission), high surface area for vapor adsorption and condensation, and controlled liquid management (controlled directional wicking and storage). The fabric can be colorized, for example, by dyeing or printing. Additionally, an insulative material may be contained in the ePTFE to give the fabric insulative properties. Alternatively, a colorant may be contained in the ePTFE to provide suitable color to the ePTFE. Alternatively, a high index of refraction material may be contained in the ePTFE to provide an improved appearance when wet or dirty. A polymer membrane and/or a textile may be laminated to the fabric to produce a laminated article. In addition, the fabric is quiet, soft, and drapable, making it especially suitable for use in garments (e.g., jackets, pants, hats, and socks), footwear, and gloves.

In one exemplary embodiment, the ePTFE fibers have a node and fibril structure where the nodes are interconnected by fibrils, the space between which defines passageways through the fibers. Also, the ePTFE fibers are microporous. The node and fibril structure within the ePTFE fiber permits the fiber, and fabrics woven or knitted with the fiber, to be highly breathable and allow for the penetration of colorants. Also, the matrix provided by the nodes and fibrils allows for the inclusion of desired fillers and/or additives, i.e. a high index of refraction material ($TiO_2$).

It is to be appreciated that with respect to the ePTFE fibers; reference is made herein with respect to expanded polytetrafluorethylene fibers for ease of discussion. However, it is to be understood that any suitable low density, conformable fluoropolymer fiber may be used interchangeably with the ePTFE fiber described within this application. Non-limiting examples of suitable fluoropolymers include, but are not limited to, expanded PTFE, expanded modified PTFE, expanded copolymers of PTFE, fluorinated ethylene propylene (FEP), and perfluoroalkoxy copolymer resin (PFA). Patents have been granted on expandable blends of PTFE, expandable modified PTFE, and expanded copolymers of PTFE, such as, but not limited to, U.S. Pat. No. 5,708,044 to Branca; U.S. Pat. No. 6,541,589 to Baillie; U.S. Pat. No. 7,531,611 to Sabol et al.; U.S. Pat. No. 8,637,144 to Ford; and U.S. patent application Ser. No. 12/410,050 to Xu et al.

In one or more embodiment, the fluoropolymer fibers may be substituted with one or more of the following materials: ultra-high molecular weight polyethylene as taught in U.S. Patent Publication No. 2014/0212612 to Sbriglia; polyparaxylylene as taught in U.S. Provisional Application No. 62/030,419 to Sbriglia; polylactic acid as taught in U.S. Provisional Patent Application No. 62/030,408 to Sbriglia, et al.; VDF-co-(TFE or TrFE) polymers as taught in U.S. Provisional Patent Application No. 62/030,442 to Sbriglia; and alternating poly(ethylene tetrafluoroethylene) as taught in U.S. Provisional Patent Application No. 62/030,448 to Sbriglia.

Figure 2:
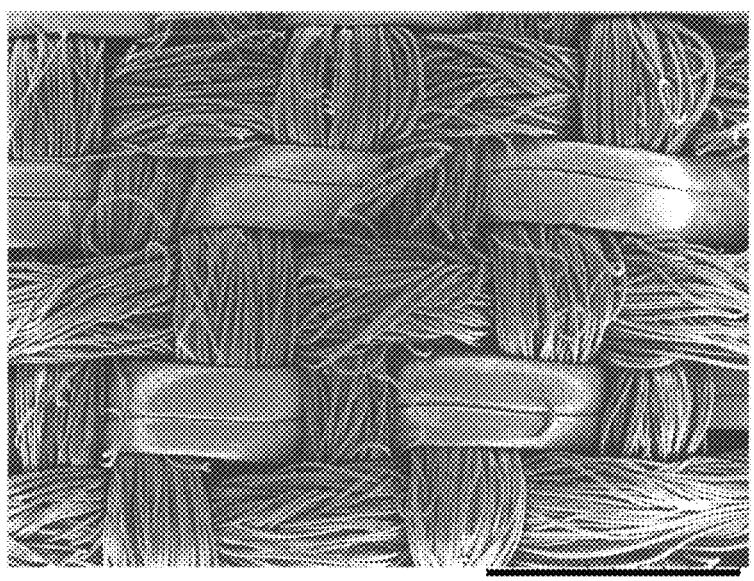
FIG. 2 is a scanning electron micrograph (SEM) of the top surface of a 2×1 woven twill fabric taken at 80× magnification in accordance with an embodiment of the invention.
Figure 3:
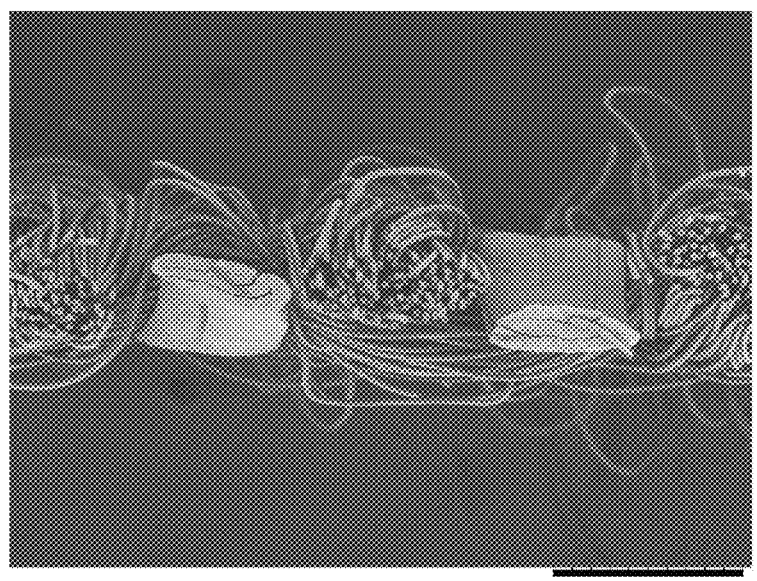
FIG. 3 is a scanning electron micrograph (SEM) of a cross-section of the woven fabric of FIG. 2 taken at 120× magnification according to an embodiment of the invention.

Additionally, the ePTFE fibers may have a substantially rectangular configuration. At least FIGS. 2 and 3 depict exemplary ePTFE fibers having substantially rectangular configurations. As used herein, the term "substantially rectangular configuration" is meant to denote that the ePTFE fibers have a rectangular or nearly rectangular cross section. That is, the ePTFE fibers have a width that is greater than its height (thickness). It is to be noted that the fibers may have a rounded or pointed edge (or side).

Further, the ePTFE fibers used herein have a pre-weaving or pre-knitting density less than about 1.0 $g/cm^3$. In exemplary embodiments, the fibers have a pre-weaving density less than about 0.9 $g/cm^3$, less than about 0.85 $g/cm^3$, less than about 0.8 $g/cm^3$, less than about 0.75 $g/cm^3$, less than about 0.7 $g/cm^3$, less than about 0.65 $g/cm^3$, less than about 0.6 $g/cm^3$, less than about 0.5 $g/cm^3$, less than about 0.4 $g/cm^3$, less than about 0.3 $g/cm^3$, or less than about 0.2 $g/cm^3$. It is to be noted that processes used to make a fabric, such as weaving or knitting, may increase the density of the ePTFE fibers. As a result, the fibers may have a post-weaving or post-knitting density less than or equal to about 1.2 $g/cm^3$. The low density of the ePTFE fiber (both pre- and post-weave or knit) also enhances the breathability of the fabrics made therewith.

The ePTFE fibers have a pre- or post-weaving or knitting tenacity greater than about 1.5 cN/dtex. In at least one embodiment of the invention, the ePTFE fibers have a tenacity from about 1.5 cN/dtex to about 7 cN/dtex, from about 2 cN/dtex to about 6 cN/dtex, or from about 2.5 cN/dtex to about 5 cN/dtex. Further, the ePTFE fibers have a fiber break strength of at least about 1.5 N. In one or more embodiment, the ePTFE fibers have a fiber break strength from about 2 N to about 20 N, from about 3 N to about 19 N, from about 4 N to about 18 N, or from about 5 N to about 17 N.

Additionally, the ePTFE fibers may have a pre- or post-weaving or knitting weight per length of about 20 dtex to about 1200 dtex, from about 30 dtex to about 1000 dtex, from about 40 dtex to about 500 dtex, from about 50 dtex to about 450 dtex, from about 100 dtex to about 400 dtex, or from about 150 dtex to about 300 dtex. It is to be appreciated that a lower dtex provides a lower weight/area fabric, which enhances the comfort of a garment formed from the fabric.

The ePTFE fibers also have a height (thickness) (pre- or post-weaving or knitting) less than about 500 microns. In some embodiments, the thickness ranges from about 10 microns to about 500 microns, from 15 microns to about 250 microns, from about 20 microns to about 150 microns, from about 25 microns to 100 microns, from about 30 microns to 80 microns, or from about 35 microns to 50 microns. The pre- or post-weaving or knitting height (thickness) may be less than 500 microns, less than 400 microns, less than 300 microns, less then 200 microns, less then 100 microns, or less than 50 microns. The ePTFE fibers also have a width (pre- or post-weaving or knitting) that is less than about 4.0 mm.

In at least one exemplary embodiment, the ePTFE fibers have a pre- or post-weaving or knitting width from about 0.05 mm to about 4.0 mm, from about 0.1 mm to about 3.0 mm, from about 0.3 mm to about 2.0 mm. or from about 0.5 mm to about 1.5 mm. In exemplary embodiments, the aspect ratio (i.e., width to height ratio) of the ePTFE fibers is greater than 1. In some embodiments, the aspect ratio is greater than about 2, greater than about 5, greater than about 10, greater than about 15, greater than about 20, or greater than about 25. A high aspect ratio, such as is achieved by the ePTFE fibers, enables low weight per area fabrics, easier and more efficient reshaping, and can achieve higher coverage in a woven or knitted fabric.

In one embodiment, the ePTFE fiber has a substantially round configuration. As used herein, the term "substantially round" is meant to denote that the fiber has a round or nearly round configuration and an aspect ratio of about 1.

Additionally, the ePTFE fiber may contain therein an insulative material, such as, for example, an aerogel. Such ePTFE fibers may be rendered hydrophilic and may be incorporated into a woven or knit fabric to give the fabric insulative properties.

Additionally, the ePTFE fiber may contain therein a colorant, such as, for example, a pigment. Such ePTFE fibers may be rendered hydrophilic and may be incorporated into a woven or knit fabric to give the fabric additional aesthetic control.

Additionally, the ePTFE may contain therein a high index of refraction material, such as, for example, $TiO_2$. Such ePTFE fibers may be rendered hydrophilic and may be incorporated into a woven or knit fabric to give the fabric a better appearance when wet or dirty.

The low density ePTFE fibers described herein may be woven or knitted with at least one other weave or knit fiber (e.g., a non-ePTFE fiber) to form a fabric that provides a combination of high breathability and controlled moisture (liquid and vapor) management. Suitable non-ePTFE fibers for use in weaving or knitting with the ePTFE fibers include, but are not limited to, rayon, polyester, polyethylene, polypropylene, cotton, wool, silk, aramid, polyamide, acrylic, olefin, spandex, and combinations and blends thereof. The weave or knit fiber(s) may be smooth or have a textured surface. Additionally, the weave or knit fiber(s) may be selected depending on the desired performance properties of the woven or knit fabric.

In one embodiment, the ePTFE fiber and one or more non-ePTFE fibers are woven to form a woven fabric. For example, one or more ePTFE fiber may be positioned adjacent to or alongside one or more non-ePTFE fiber and treated as a weave fiber. Alternatively, the non-ePTFE fiber may be wrapped around the ePTFE fiber (or vice versa) and woven into a woven fabric. In another embodiment, the ePTFE fibers and non-ePTFE fibers may be twisted or braided together and treated as a single weaving fiber. In a further embodiment, the ePTFE fibers may be wrapped about the non-ePTFE fibers so as to encapsulate the non-ePTFE fiber in a core/sheath configuration (or vice versa). Any weave pattern, such as, but not limited to, plain weaves, satin weaves, twill weaves, and basket weaves, may be used to form the ePTFE fibers and the non-ePTFE fiber(s) into a woven fabric.

The ePTFE fiber, whether alone or in combination with a non-ePTFE fiber(s), may be utilized in the warp and/or the weft directions. For example, the ePTFE fiber may be used solely in the warp or weft direction or in the warp and the weft direction and may be alternated by non-ePTFE fiber(s) or the non-ePTFE fiber(s) may be inserted at a predetermined interval, such as, for example, every other pick, every third pick, every fourth pick, etc. The ePTFE fiber may alternatively be present in both the warp and weft directions at predetermined intervals. As one non-limiting example, the warp fibers may be formed of polyamide fibers and the weft fibers may be formed of polyamide fibers and the ePTFE fibers in alternating picks. In other embodiments, the weft (or warp) direction may be composed of ePTFE fibers and the warp fibers (or weft) may be composed of polyamide fibers. It is to be appreciated that any number of variations of weave patterns where the ePTFE fiber and/or non-ePTFE fiber are used in the warp and weft directions are possible and that such weave patterns are considered within the purview of the invention. In addition, the conformability of the ePTFE fibers permits the ePTFE fiber to curl and/or fold upon itself to conform to weave spacing provided between the crossovers of the warp and weft fibers in a woven fabric.

In another embodiment, the ePTFE fibers, in combination with a knit fiber (e.g., non-ePTFE fiber), may be knit into a knit fabric. As discussed above, the non-ePTFE fiber(s) may be selected depending on the desired performance properties of the knit fabric. The ePTFE fiber, together with the knit fiber, may be knit utilizing any knit pattern, such as, but not limited to, warp knits, weft knits, circular knits, plain knits, fleece knits, fuzzy knits, waffle knits, jersey knits, and an intimate blend knit. The ePTFE fiber may be positioned adjacent to or alongside the non-ePTFE fiber and treated as a single knit fiber. Alternatively, the knit fiber may be wrapped around the ePTFE fiber (or vice versa) and knit into a knitted fabric. In another embodiment, the ePTFE fibers and non-ePTFE fibers may be twisted or braided together and treated as a single knit fiber. In a further embodiment, the ePTFE fibers may be wrapped about the non-ePTFE fibers so as to encapsulate the non-ePTFE fiber in a core/sheath configuration (or vice versa).

In one embodiment, the woven or knit fabric may contain at least 15% ePTFE fibers by weight based on the final fabric. In some alternative embodiments, the fabric contains at least about 15% ePTFE fibers, at least about 20% ePTFE fibers, at least about 25% ePTFE fibers, at least about 30% ePTFE fibers, at least about 35% ePTFE fibers, at least about 40% ePTFE fibers, at least about 45% ePTFE fibers, at least about 50% ePTFE fibers, at least about 55% ePTFE fibers, at least about 60% ePTFE fibers, at least about 65% ePTFE fibers, at least about 70% ePTFE fibers, at least about 75% ePTFE fibers, at least about 80% ePTFE fibers, at least about 85% ePTFE fibers, at least about 90% ePTFE fibers, or at least about 95% ePTFE fibers. The ePTFE fibers may be present in the woven or knit fabric in an amount from about 50% to about 98%, from about 55% to about 95%, from about 60% to about 90%, from about 65% to about 80%, or from about 70% to about 75%.

The conformable low density ePTFE fibers described above are naturally hydrophobic. However, the low density ePTFE fibers may be rendered hydrophilic by the application of a hydrophilic treatment. Contamination of the ePTFE fiber also renders the ePTFE fiber hydrophilic. For example, if the ePTFE fiber is contaminated, such as by sebum, sweat, detergent, surfactants, or finishing from dyes, the ePTFE fiber becomes hydrophilic. The hydrophilic, low density ePTFE fibers may be used to control moisture such as water or sweat by directing, moving, and storing the liquid, or vapor, within the hydrophilic ePTFE fiber microstructure.

Figure 8:
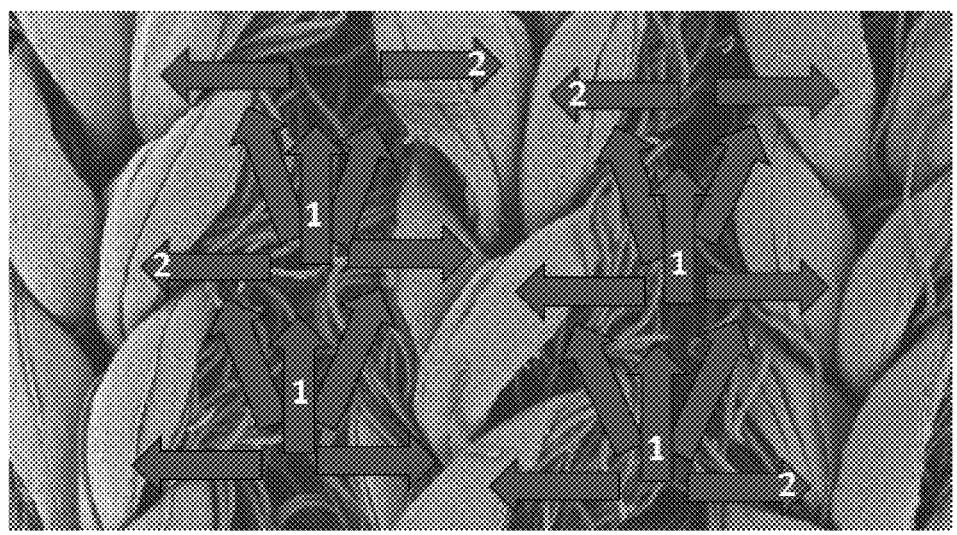
FIG. 8 is the a scanning electron micrograph (SEM) of the top surface of the woven fabric depicted in FIG. 2 with superimposed arrows illustrating the wicking of a liquid into the inner structure of hydrophilic ePTFE fibers in accordance with an embodiment of the invention.

Once the ePTFE fibers are rendered hydrophilic, the hydrophilic ePTFE fibers are able to control both the wicking and storage of liquids in the woven or knit fabric. Wicking permits liquid such as perspiration to enter the fabric and move it away from the skin where it can evaporate, thereby enhancing the comfort of the wearer of the garment. In particular, the ePTFE fibers are able to be wetted and a liquid (e.g., water or sweat) may enter the inner microstructure and be contained inside the microstructure of the hydrophilic ePTFE fiber. Additionally, the hydrophilic ePTFE fibers are able to pull liquid from adjacent non-ePTFE fibers and/or spaces within the fabric. As shown in FIG. 8, liquid (e.g., water or sweat), depicted by arrows 1, enters a fabric and travels through the non-ePTFE fiber capillaries and spaces. As shown generally by arrows 2, the liquid is pulled into the hydrophilic, low density ePTFE fiber. More specifically, the liquid is pulled into the inner structure (e.g., microstructure) of the hydrophilic ePTFE fibers, thereby removing or substantially removing the liquid from the non-ePTFE fibers and/or spaces within the fabric. The presence of hydrophilic ePTFE fibers adjacent to or surrounding the non-ePTFE fibers in the fabric creates channels, surfaces, and/or pulling forces to allow the liquid to wick via a pumping mechanism into empty air space within the fibrous network of the hydrophilic ePTFE fiber.

The hydrophilic ePTFE fibers permit the entry of a liquid into the ePTFE fiber microstructure, which pulls the liquid away from the other fibers, spaces between the fibers, and fibers that may touch the user. Such controlled wicking reduces or eliminates any thermal conductivity that may be otherwise be transferred to the end user via the liquid located within the fabric. The liquid, once in the hydrophilic ePTFE fibers, is not transferred out of the ePTFE fiber in liquid form to another layer or location, such as, for example, air spaces or fibers that may touch the body of an end user. The hydrophilic ePTFE fiber holds the liquid until it is evaporated from the fiber in vapor form. In addition, little to none of the liquid remains on the outside of the hydrophilic ePTFE fibers, making the hydrophilic ePTFE fibers feel dry even when they contain liquid therein. Also, by wicking and storing the liquid within the hydrophilic ePTFE fiber, the fabric feels dry and does not transfer a feeling of dampness to the end user. The amount of wicking and effectiveness of the storage of the liquid within the hydrophilic fiber may be controlled by density, denier, amount of hydrophilic ePTFE fibers in the fabric, and where the ePTFE fiber is incorporated into the fabric. In some embodiments, this microstructure may store in excess of 80% liquid by volume within the defined fiber area. (80% air->80% liquid). Thus, fabrics may be engineered and/or tailored for a specific end use.

In humid environments, the hydrophilic ePTFE fibers may exhibit moisture adsorption and condensation and collect moisture vapor on the internal surfaces of the fiber (e.g., in the microstructure of the ePTFE fiber). The adsorption and condensation of moisture inside the hydrophilic ePTFE fiber leaves the outside of the ePTFE fiber dry, or at least substantially dry, such that a feeling of dampness is not imparted to the end user.

The hydrophilic, low density ePTFE fabrics exhibit a vertical wicking of greater than 10 mm in 10 mins, greater than 15 mm in 10 mins, or greater than 30 mm in 10 mins. It is desirable that the fabric have both a high vertical wicking to move the liquid, such as away from the skin, and a fast dry time to remove the liquid from the fabric itself. Although these features are competing factors, the hydrophilic, low density ePTFE fabrics achieve both high wicking (e.g., greater than or equal to about 30 mm in 10 mins) and a fast dry time (e.g., less than 30 minutes).

In some embodiments, it may be desirable to impart flame resistance to the woven or knitted fabric. In such an embodiment, a fire retarding fiber may be employed as at least one of the weave fibers or knit fibers. Non-limiting examples of aramids, flame resistant cottons, polybenzimidazole (PBI®), polybenzoxazole (PBO), flame resistant rayon, modacrylic blends, carbon, fiberglass, polyacrylonitrile (PAN), and combinations and blends thereof.

The hydrophilic ePTFE fabrics described herein have a moisture vapor transmission rate (MVTR) that is greater than about 3000 $g/m^2/24$ hours, greater than about 5000 $g/m^2/24$ hours, greater than about 8000 $g/m^2/24$ hours, greater than about 10000 $g/m^2/24$ hours, greater than about 12000 $g/m^2/24$ hours, greater than about 15000 $g/m^2/24$ hours, greater than about 20000 $g/m^2/24$ hours, or greater than about 25000 $g/m^2/24$ hours when tested according to the moisture vapor transmission rate (MVTR) Test Method described herein. As used herein, the term "breathable" or "breathability" refers to hydrophilic, low density fabrics or laminates that have a moisture vapor transmission rate (MVTR) of at least about 3000 $grams/m^2/24$ hours. Moisture vapor transmission, or breathability, provides cooling to a wearer of a garment. for example, made from the fabric.

The hydrophilic ePTFE fabrics also have an air permeability that is less than about 1000 cfm, less than about 500 cfm, less than 300 cfm, less than about 100 cfm, less than about 50 cfm, less than about 25 cfm, less than about 20 cfm, less than about 15 cfm, less than about 10 cfm, less than about 5 cfm, and even less than about 3 cfm. It is to be understood that low air permeability correlates to improved windproofness of the fabric.

Further, the ePTFE fabrics described herein have a soft hand and are drapable, making them suitable for use in garments. The woven and knit fabrics have an average stiffness less than about 1000 g, less than about 500 g, less than about 400 g, less than about 300 g, less than about 250 g, less than about 200 g, less than about 150 g, less than about 100 g, and even less than about 50 g. It was surprisingly discovered that in addition to a soft hand, the hydrophilic ePTFE fabrics demonstrated a reduction in noise associated with bending or folding the fabric. It was further discovered that even with the addition of a porous polymer membrane, as discussed hereafter, the noise was reduced, particularly when compared to conventional ePTFE laminates.

The hydrophilic, low density ePTFE fabrics are also resistant to tearing. For example, the woven fabric has a tear strength from about 10 N to about 200 N (or even greater), from about 15 N to about 150 N, or from about 20 N to about 100 N as measured by the Elemendorf Tear test described herein. It was discovered that the hydrophilic ePTFE fabric had an improved tear strength over conventional, non ePTFE fabrics. Low density ePTFE woven and knit fabrics described herein also have a break strength from about 100 N to about 1500 N (or even greater), from about 300 N to about 1000 N, or from about 500 N to about 750 N as measured by the Fabric Break Strength test set forth herein. Such high tear strengths and break strengths enable the low density ePTFE fabrics to be more durable in use.

Treatments may be provided to impart one or more desired functionality, such as, but not limited to, oleophobicity to the woven or knit fabric. Coatings or treatments may be applied to one or both sides of the hydrophilic ePTFE fabric, and may penetrate through or only partially through the ePTFE fabric. It is to be understood that any functional protective layer, functional coating, or functional membrane, such as, but not limited to, polyamides, polyesters, polyurethanes, cellophane, and non-fluoropolymer membranes that are both waterproof and breathable may be attached or otherwise affixed or layered on the hydrophilic ePTFE fabric.

The hydrophilic ePTFE fabrics may be colored by a suitable colorant composition. In one embodiment, the ePTFE fiber has a microstructure where the pores of the ePTFE fiber are sufficiently open to provide properties such as moisture vapor transmission and penetration by coatings of colorants. In one embodiment, the ePTFE fiber has a surface that, when printed, provides a durable aesthetic. Aesthetic durability can be achieved in some embodiments with colorant coating compositions that include a pigment having a particle size that is sufficiently small to fit within the pores of the ePTFE fiber and/or within the woven or knit fabric. Multiple colors may be applied using multiple pigments, by varying the concentrations of one or more pigments, or by a combination of these techniques. Additionally, the coating composition may be applied in any form, such as a solid, pattern, or print. A coating composition can be applied to the woven fabric by conventional printing methods. Application methods for colorizing include but are not limited to, transfer coating, screen printing, gravure printing, ink-jet printing, and knife coating. In some embodiments, the ePTFE fiber remains uncolored while the weave fiber(s) in the woven or knit fabric are colored by the colorant composition. Other coatings or treatments may be applied, such as, for example, to make the fabric UV stable, anti-microbial, anti-fungal, contamination resistant, etc.

In at least one embodiment, a porous or microporous polymer membrane is laminated or bonded to the hydrophilic ePTFE fabric. Non-limiting examples of porous membranes including expanded PTFE, expanded modified PTFE, expanded copolymers of PTFE, fluorinated ethylene propylene (FEP), and perfluoroalkoxy copolymer resin (PFA). Polymeric materials such as polyolefins (e.g., polypropylene and polyethylene), polyurethanes, and polyesters are considered to be within the purview of the invention provided that the polymeric material can be processed to form porous or microporous membrane structures. It is to be appreciated that even when the hydrophilic ePTFE fabric is laminated or bonded to a porous or microporous membrane, the resulting laminate remains highly breathable.

The microporous membrane may be an asymmetric membrane. As used herein, "asymmetric" is meant to indicate that the membrane structure includes multiple layers of ePTFE within the membrane where at least one layer within the membrane has a microstructure that is different from the microstructure of a second layer within the membrane. The difference between the first microstructure and the second microstructure may be caused by, for example, a difference in pore size, a difference in node and/or fibril geometry or size, and/or a difference in density.

In a further embodiment, a textile may be attached to the microporous membrane or directly to the hydrophilic ePTFE fabric. As used herein, the term "textile" is meant to denote any woven, nonwoven, felt, fleece, or knit and can be composed of natural and/or synthetic fiber materials and/or other fibers or flocking materials. For example, the textile may be comprised of materials such as, but not limited to cotton, rayon, nylon, polyester, and blends thereof. The weight of the material forming the textile is not particularly limited except as required by the application. In exemplary embodiments, the textile is air permeable and breathable.

Any suitable process for joining the membrane and/or the textile to the low density ePTFE fabric (and textile to the membrane) may be used, such as gravure lamination, fusion bonding, spray adhesive bonding, and the like. The adhesive may be applied discontinuously or continuously, provided that breathability through the laminate is maintained. For example, the adhesive may be applied in the form of discontinuous attachments, such as by discrete dots or grid pattern, or in the form of an adhesive web to adhere layers of the laminate together.

The woven and knit hydrophilic ePTFE fabrics are suitable for use in various applications, including but not limited to garments (including jackets, pants, hats, and socks), footwear, gloves, and the like. The fabrics provide a combination of high breathability (high moisture vapor transmission), and controlled moisture management (moisture vapor adsorption and condensation, controlled directional wicking and storage). The ePTFE fiber may be woven or knit as a single fiber, as part of a multifilament fiber, or may be twisted or braided with another fiber to form a woven or knit fabric. The ePTFE woven and knit fabrics can be used alone, or they can be used in conjunction with a polymer membrane and/or textile. The surface of the hydrophilic ePTFE woven or knit fabric can be colorized, for example, by printing. It should be appreciated that the benefits and advantages described herein equally apply to the articles discussed herein.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

TEST METHODS

It should be understood that although certain methods and equipment are described below, other methods or equipment determined suitable by one of ordinary skill in the art may be alternatively utilized.

Fiber Weight Per Length

A 45 meter length of fiber was obtained using a skein reel. The 45 meter length was then weighed on a scale with precision to 0.0001 grams. This weight was then multiplied by 200 to give the weight per length in terms of denier (g/9000 m). Three measurements were taken and averaged.

Fiber Width

Fiber width was measured in a conventional manner utilizing a 10× eye loop having gradations to the nearest 0.1 mm. Three measurements were taken and averaged to determine the width to the nearest 0.05 mm.

Fiber Thickness

Fiber thickness was measured utilizing a snap gauge accurate to the nearest 0.0001 inch. Care was taken to not to compress the fibers with the snap gauge. Three measurements were taken and averaged and then converted to the nearest 0.0001 mm.

Fiber Density

Fiber density was calculated utilizing the previously measured fiber weight per length, fiber width and fiber thickness using the following formula:

$$\text{Fiber Density}(g/cm^3) = \frac{\text{Fiber wt per length}(dtex)}{\text{Fiber Width(mm)} * \text{Fiber Thickness(mm)} * 10{,}000}$$

Fiber Break Strength

The fiber break strength was the measurement of the maximum load needed to break (rupture) the fiber. The break strength was measured by a tensile tester, such as an Instron Machine of Canton, Mass. The Instron® machine was outfitted with fiber (horn type) jaws that are suitable for securing fibers and strand goods during the measurement of tensile loading. The cross-head speed of the tensile tester was 25.4 cm per minute. The gauge length was 25.4 cm. Five measurements of each fiber type were taken with the average reported in units of Newtons.

Fiber Tenacity

Fiber tenacity is the break strength of the fiber normalized to the weight per length of the fiber. Fiber tenacity was calculated using the following formula:

$$\text{Fiber tenacity}(cN/dtex) = \frac{\text{Fiber break strength}(N)*100}{\text{Fiber weight per length}(dtex)}$$

Mass/Area

In order to measure mass per area, fabric samples were prepared having an area of at least 100 cm². A Karl Schroder 100 cm² circle cutter may be used. Each sample was weighed using a Mettler Toledo Scale Model AB204. The scale was recalibrated prior to weighing specimens, and the results were reported in grams per square meter (gsm). Three samples were taken per specimen and the average was reported.

SEM Sample Preparation Method

Cross-section SEM samples were prepared by spraying them with liquid nitrogen and then cutting the sprayed samples with a diamond knife in a Leica ultracut UCT, available from Leica Microsystems, Wetzlar, Germany.

Fabric Tear Strength

This test is designed to determine the average force required to propagate a single-rip tongue-type tear starting from a cut in woven fabric. A Thwing-Albert Heavy Duty Elmendorf Tearing Tester (MA1227) was used. The instrument was calibrated and the correct pendulum weight was selected. The pendulum was raised to the starting position. The specimen was placed in jaws and clamped. The specimen was centered with the bottom edge carefully against the stops. The upper area of the specimen was directed towards the pendulum to ensure a shearing action. The test was performed until a complete tear was achieved. The digital readout was recorded in Newtons. This was repeated until a set (3 warp and 3 weft) was completed. The reported results are the average of the measurements for each the warp and weft direction.

Fabric Break Strength

This test was performed in accordance with the general teachings of ASTM D 751. 5 warp and 5 fill specimens with dimensions as 4"×6' were cut, with the long dimension parallel to the test direction. The specimens were conditioned at 70±2° F., 65±2% RH prior to testing for at least 1 hour. Next, a template of 1.5"×6" was obtained and aligned with the 6" edge of the sample. A thin guideline was drawn (at the 1.5" side) along the fabric down the full length of the specimen. This line must be as accurate as possible and parallel to the lengthwise fibers. The intent of these lines is to ensure that the center portion of the specimen is tested and that the specimen is properly aligned with the jaws for the warp and fill fibers. This is important in order to obtain the true specimen performance. An Instron Model 5565 was calibrated and a 1000 lb. load cell was installed. The 1"×1" rubber jaws were placed on the same side of the top and bottom grips and the 1"×3" rubber jaws were placed on the other side of the top and bottom grips (the 1"×1" jaw should clamp to a 1"×3" jaw). The gage length was set to 3". The specimen was placed between the open jaws, aligning the reference line with the outer edge of both the top and the bottom 1"×1" jaws. The top jaw was closed by using a pneumatic foot pedal. The specimen was allowed to hang freely and the bottom jaw was closed by pushing down another click on the foot pedal. The load cell was balanced. Then, the test was started by pressing start on the control panel. If slippage of the specimen in the jaws was observed, the data was disregarded and re-cut and retested. If specimen breaks in the jaw were observed, the data was disregarded and re-cut and retested. If breaks at the edge of the jaw were observed, it was checked to see if the majority of specimen breaks are near the edge of the jaw because the jaws are preventing the specimen from contracting in width as the force is applied; if so then, "jaw breaks" are a characteristic of the material and no retests are necessary. These steps were repeated 5 times for each of the warp and fill specimens and the average maximum force at break was reported for each direction.

Fabric Stiffness

A Thwing Albert Handle-O-Meter with a 1000 g beam and ¼" slot width was used to measure the hand (stiffness). A 4"×4" sample was cut from the fabric. The specimen was placed face up on the specimen platform. The specimen was lined up so that the test direction was perpendicular to the slot to test the warp direction. The START/Test button was pressed until a click is heard, then released. The number appearing on the digital display after a second click is heard was recorded. The reading does not return to zero, it indicates the peak reading of each individual test. The specimen was turned over and tested again, recording the number. Then the specimen was turned 90 degrees to test the fill direction, recording the number. Finally, the specimen was turned over and tested again, recording the number. The 4 recorded numbers were added together (1 Warp Face, 1 Warp Back, 1 Fill face, 1 Fill Back) to calculate the overall stiffness of the specimen in grams. The results were reported for one sample.

Air Permeability—Frazier Number Method

Air permeability was measured by clamping a test sample in a gasketed flanged fixture which provided a circular area of approximately 6 square inches (2.75 inches diameter) for air flow measurement. The upstream side of the sample fixture was connected to a flow meter in line with a source of dry compressed air. The downstream side of the sample fixture was open to the atmosphere.

Testing was accomplished by applying a pressure of 0.5 inches of water to the upstream side of the sample and recording the flow rate of the air passing through the in-line flowmeter (a ball-float rotameter).

The sample was conditioned at 70° F. (21.1° C.) and 65% relative humidity for at least 4 hours prior to testing.

Results were reported in terms of Frazier Number which is air flow in cubic feet/minute/square foot of sample at 0.5 inches water pressure. N=3.

Moisture Vapor Transmission Rate Test—(MVTR)

The MVTR for each sample fabric was determined in accordance with the general teachings of ISO 15496 except that the sample water vapor transmission (WVP) was converted into MVTR moisture vapor transmission rate (MVTR) based on the apparatus water vapor transmission (WVPapp) and using the following conversion.

MVTR=(Delta $P$ value*24)/((1/WVP)+(1+WVPapp value))

To ensure comparable results, the specimens were conditioned at 73.4±0.4° F. and 50±2% rH for 2 hrs prior to testing and the bath water was a constant 73.4° F.±0.4° F.

The MVTR for each sample was measured once, and the results are reported as $g/m^2/24$ hours.

Vertical Wicking:

One 500 ml Erlemeyer flasks was filled with 200 ml of water colored with any color of suitable to make water level visible on the sample. Two 6"×1" strips (the 6" length is cut in the warp direction) were cut from the sample fabric. The top edge of the strip (approximately ⅛"-¼" from top) was pierced with a long straight pin (the pin shall be parallel with the 1" edge. The strip was suspended from the pin in the flask filled with 200 ml of colored water (the pin rested on the edges of the flask opening). After 10 minutes, the strip was removed from the flask and the water level was measured on the strip (in mm) and recorded. This procedure was used to determine the rate at which water wicks test samples suspended in water. N=2

Weight Gain and Drying Time

Fabric samples and blotting paper were conditioned at 65±2% RH and 211° C. (70–2° F.) for a minimum of four hours before testing. Three specimens were taken from each sample, with each specimen consisted of a 2"×2" piece cut. The conditioned specimen was weighed using a laboratory balance, accurate to 0.1 g. 100 ml of distilled water was placed into a 250 ml beaker.

One specimen was submerged in the beaker for 30 minutes, making certain that the specimen was completely submerged under the water to ensure complete wetting. The specimen was removed and sandwiched between two pieces of unused blotter paper and passed through wringer. The piece was left sandwiched in the wet blotters. This process was repeated for the remaining two specimens of the same sample. The blotted specimens were weighed one at a time and the weight was recorded as wet weight. The weight gain for the fabric is considered to be the dry weight subtracted from the wet weight. The recorded weight gain is the average of the three specimens.

Each sample was hung separately to dry in a location that is in conditions of 65±2% RH and 21±1° C. (70±2° F.). One sample was weighed to the nearest 0.1 g every 5 minutes recording each weight, until completely dry. This was repeated until all of the specimens returned to their original dry weight. At this time the overall drying time was calculated by averaging the dry time of all three specimens.

The wringer, household laundry type, was equipped with soft rubber squeeze rolls 5.1–6.4 cm in diameter and 28.0–30.5 cm in length, with a hardness of 70–80 when measured using the Durometer tester. The wringer should be constructed so that the pressure on the top of the piece of fabric is maintained by a dead weight or lever system such that the total pressure (resulting from the total of the dead weight or lever system and the weight of the roller) was 27.2±0.5 kg. It should be power-driven at a constant rate so that the piece of fabric passed through the rolls at a rate of 2.5 cm/s. The diameters of the squeeze rolls should be measured with a pair of calipers or with a suitable micrometer. Measurements should be made at five different locations along the length of each roll, and the average of these measurements taken as the diameter of the roll. The load applied by the dead weight or lever system should be measured using a spring scale or balance, and suspending the top roll of the wringer from the scale by means of two tapes of equal length. The tapes should be placed between the rolls near their ends and should be provided with a means of holding them sufficiently far apart so that there is no contact between the tapes and the top structural member of the wringer and loading system. The spring scale or balance should be suspended from a suitable rigid support and provided with a turnbuckle or other device for adjusting the height of the scale. The usual precautions concerning the zero correction of spring scales should be observed. The turnbuckle or other device should then be adjusted to place the weight of the top roll and its weighting system on the spring scale or balance, and the system should be considered to be in equilibrium when the top roll of the wringer had been lifted just sufficiently from the bottom roll to permit vision between the bottoms of the tapes and the top of the bottom roll. At this point, the dead weight on the loading system should be adjusted until the spring scale or balance indicates a load of 27.7±0.5 kg. The calibration of the spring scale or balance should be certified by the use of known certified dead weights of 24.95, 27.22, and 29.48 kg±0.23 kg total weight. The spring scale should be accurate to within ±0.2268 kg at each of the three verification loads. The linear speed of the rolls should be measured by feeding a thin steel tape through the rolls. The steel tapes should be at least 150 cm long and should be accurate to within 3 mm per 150 cm. The time required for exactly 150 cm of this tape to pass through the nip of the rolls should be measured in seconds to the nearest second with a stopwatch calibrated in intervals of not more than 0.5 s. The speed of the rolls should be adjusted until the time required for 150 cm of tape to pass through the nip of the roll is 60-2 s. N=3

Tissue Dampness Test

Fabric samples and 0.08 g hi-yield separating tissues (pink color) were conditioned at 65±2% RH and 21±1° C. (70±2° F.) for a minimum of four hours before testing. Three specimens were taken from each sample, with each specimen consisted of a 2"×2" piece cut. Two 5"×5"×¼" glass plates were obtained and cleaned and dried.

One of the glass plates was set on a flat surface. Using a plastic pipette, 5 drops of water were placed onto the center of the glass plate (roughly 0.07 g of water). The test specimen was then placed onto the center of the glass plate, on the water, and left to rest for at least 1 min, giving sufficient time for water to penetrate and wick into the sample. Next, a 0.08 gram hi-yield separating tissue was placed onto the test specimen and the other glass plate was immediately placed on top. Additionally, a 1.5 lb weight was placed onto the center of the top glass plate. The sample was left to sit for at least 1 min, giving sufficient time for water to transfer to the tissue. The weight and top glass plate was removed and the pink paper was weighed. The % increase of the weight of the hi-yield separating tissue was reported as the water transfer weight gain. N=3

EXAMPLES

Example 1

A fine powder PTFE resin (Teflon 669 X, commercially available from E.I. du Pont de Nemours, Inc., Wilmington, Del.) was obtained. The resin was blended with Isopar® K in the ratio of 0.184 g/g by weight of powder. The lubricated powder was compressed in a cylinder and allowed to dwell at room temperature for 18 hours. The pellet was then ram extruded at a 169 to one reduction ratio to produce a tape of approximately 0.64 mm thick. The extruded tape was subsequently compressed to a thickness of 0.25 mm. The compressed tape was then stretched in the longitudinal direction between two banks of rolls. The speed ratio between the second bank of rolls and the first bank of rolls, hence the stretch ratio was 1.4:1 with a stretch rate of 30%/sec. The stretched tape was then restrained and dried at 200° C. The dry tape was then expanded between banks of heated rolls in a heated chamber at a temperature of 300° C. to a ratio of 1.02:1 at a stretch rate of 0.2%/sec, followed by an additional expansion ratio of 1.75:1 at a stretch rate of 46%/sec, followed by yet an additional expansion ratio of 1.02:1 at a stretch rate of 0.5%/sec. This process produced a tape with a thickness of 0.24 mm.

This tape was then slit to create a cross-section of 3.30 mm wide by 0.24 mm thick and having a weight per length of 6162 dtex. The slit tape was then expanded across a heated plate set to 390° C. at a stretch ratio of 6.00:1 with a stretch rate of 70%/sec. This was followed by another expansion across a heated plate set to 390° C. at a stretch ratio of 2.50:1 with a stretch rate of 74%/sec. This was followed by a further expansion across a heated plate set to 390° C. at a stretch ratio of 1.30:1 with a stretch rate of 26%/sec. This was followed by running across a heated plate set to 390° C. at a stretch ratio of 1.00:1 for a duration of 1.4 seconds, resulting in an amorphously locked expanded polytetrafluoroethylene (ePTFE) fiber.

The amorphously locked ePTFE fiber measured 316 dtex and had a rectangular cross-section and possessed the following properties: width=1.8 mm, height=0.0381 mm, density=0.46 g/cm3, break strength of 6.36 N, tenacity of 2.02 cN/dtex. A scanning electron micrograph of the fiber surface taken at 1000× magnification is shown in FIG. 1.

The fiber was woven to comprise a fabric blend of a 4/70/34 (ply/denier/filaments) polyamide AJT fiber (Premier Fibers, Inc., Ansonville, S.C.) and the ePTFE fiber. The obtained 4/70/34 polyamide fiber measured 358 dtex and possessed the following properties: break strength=15.03 N, tenacity=4.21 cN/dtex. The ePTFE fiber was not twisted before weaving. The weave pattern was a 2×1 twill weave and had a thread count of 54×50 threads/inch (21.2×19.7 threads/cm, Warp×Fill). The warp fibers were comprised of the polyamide fibers and the fill fibers were comprised of the polyamide fiber and the ePTFE fiber in alternating picks. The woven fabric was comprised of 18% ePTFE and 82% polyamide by weight. The woven fabric was dyed and printed for an acceptable visible appearance, with the color being applied to the polyamide fibers (i.e., the ePTFE did not become colorized). The woven fabric had the following properties: air permeability=58 cfm, dry time=20 minutes, vertical wicking=105 mm in 10 minutes, hand=160 g, break strength=1.36 kN (w)×0.90 kN (f), tear strength=125 N (w)×85 N (f). A scanning electron micrograph of the woven fabric taken at 80× magnification is shown in FIG. 2. A scanning electron micrograph of a cross-section view of the fabric taken at 120× magnification is shown in FIG. 3. The fabric had a weight of 183 g/m².

The fabric was subsequently rendered hydrophilic by washing in a washing machine for a single cycle with commercially available detergent. The fabric was permitted to air dry. The overall weight gain as measured in the Weight Gain and Drying Time Test Method for the fabric prior to and subsequent to being rendered hydrophilic was 57 gsm and 65 gsm, respectively. This resulted in an increase of 14% water weight gain after being rendered hydrophilic.

Example 2

A knitted sock was made in the following manner. A 155 denier ePTFE fiber as described in Example 1 was obtained. Each ePTFE fiber was knitted with a 70 denier (34 filament count) nylon 6,6 yarn using a 4.5 inch diameter 200 needle (stitches per complete rotation) circular knitting machine with a heel and an elasticated ankle band. The final PTFE content was 68.8% by weight (nylon content was 31.2%). The final sock after seaming the toe area with 2 ply of 30 denier nylon 6,6 yarn was a size 10 (U.S. mens sizing) and was rendered hydrophilic by washing in a washing machine for a single cycle with commercially available fabric softener (Melasoft LS 1C2800 available from Melatex Incorporated, 3818 Northmore Street, Charlotte, N.C. 28205).

Figure 4:
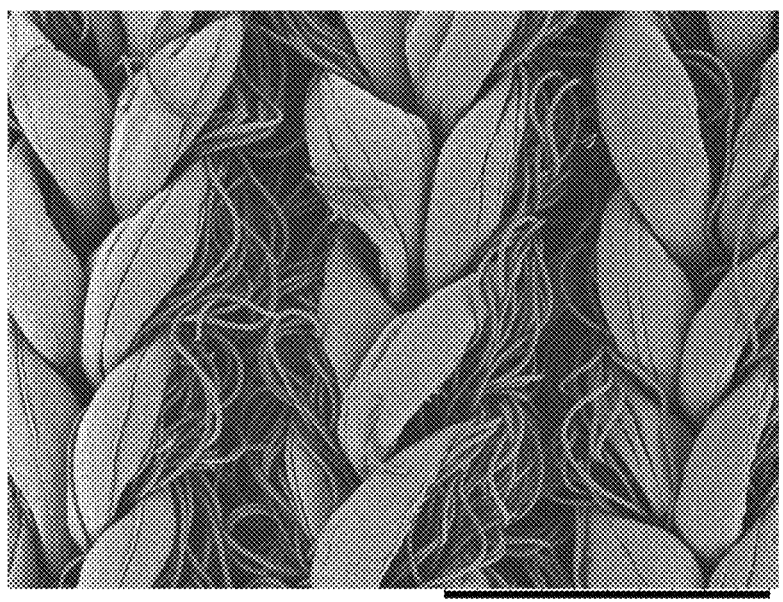
FIG. 4 is a scanning electron micrograph (SEM) of the top surface of a knit fabric taken at 80× magnification according to an exemplary embodiment of the invention.
Figure 5:
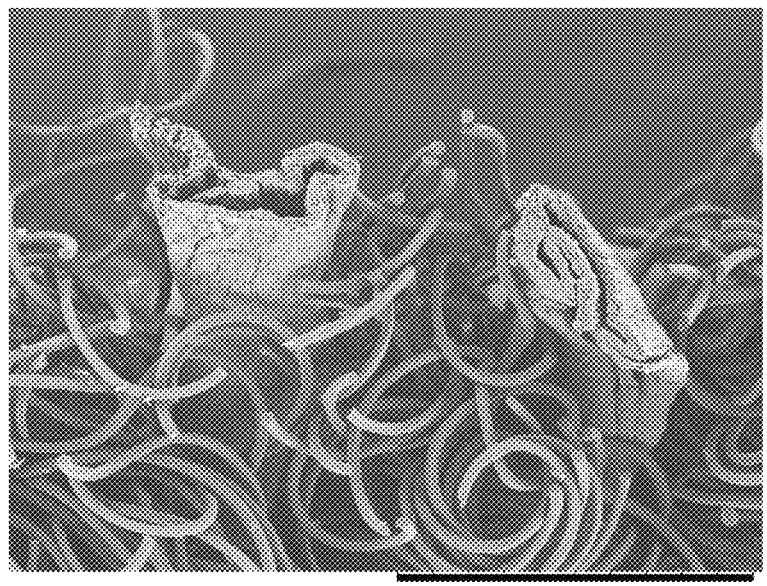
FIG. 5 is a scanning electron micrograph (SEM) of a cross-section the knit fabric of FIG. 4 taken at 180× magnification in accordance with an exemplary embodiment of the invention.

The fabric was permitted to air dry. A scanning electron micrograph of the knitted fabric taken at 80× magnification is shown in FIG. 4. A scanning electron micrograph of a cross-section view of the thus rendered hydrophilic fabric taken at 180× magnification is shown in FIG. 5. The fabric was tested in accordance with the Test Methods described above. The overall weight gain as measured in the Weight Gain and Drying Time Test Method for the fabric prior to and subsequent to after being rendered hydrophilic was 35 gsm and 74 gsm, respectively. This resulted in an increase of 111% water weight gain after being rendered hydrophilic.

A 1×6 inch swatch of the sock was subjected to the Vertical Wicking Test described above. The sock exhibited wicking of 50 mm after 10 minutes.

The sock was also subjected to the Tissue Dampness Test described above. The change in weight of the tissue associated with the sock was 12%.

Comparative Example 1

A comparative sock was made in the same manner as described in Example 2 except that the ePTFE fibers were replaced with an equal number of 70 denier Nylon 6,6 yarns. A 1×6 inch swatch of the all nylon sock was subjected to the Vertical Wicking Test described above. The all nylon fiber sock exhibited wicking of 10 mm after 10 minutes.

The all nylon sock was also subjected to the Tissue Dampness Test described above. The change in weight of tissue associated with the all nylon sock was 38%.

Comparative Example 2

Figure 6:
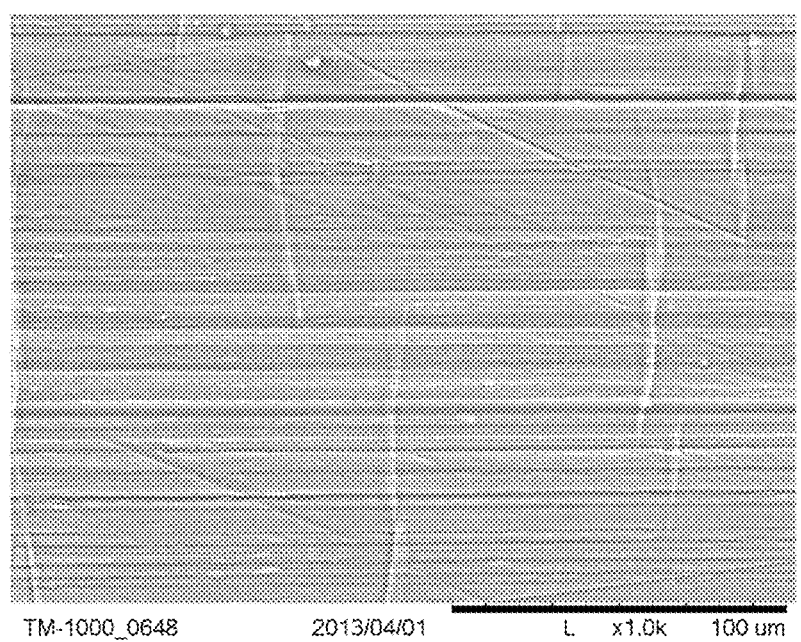
FIG. 6 is a scanning electron micrograph (SEM) of the top surface of a full density ePTFE fiber taken at 1000× magnification.
Figure 7:
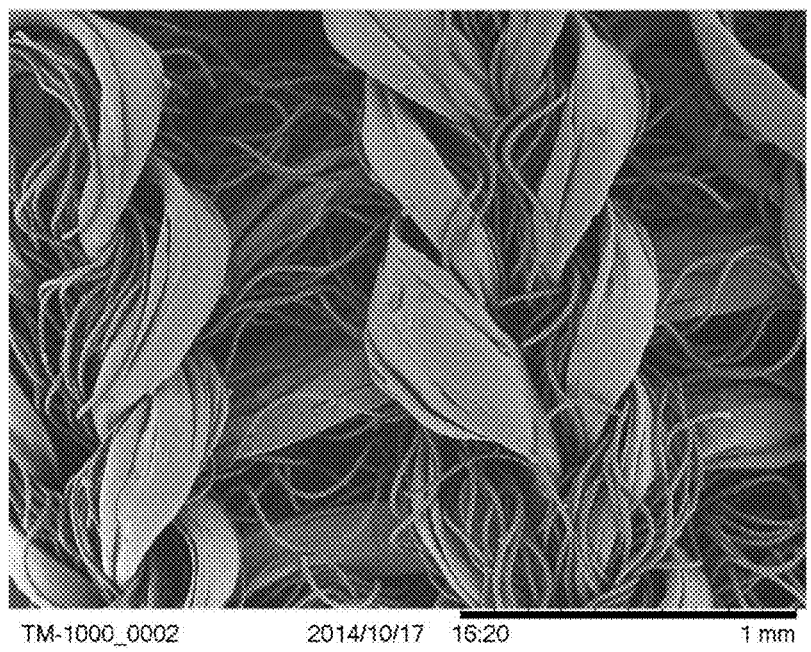
FIG. 7 is a scanning electron micrograph of a knit fabric utilizing the full density ePTFE fiber of FIG. 6 taken at 80× magnification.

A comparative sock was made in the same manner as described in Example 2 except that ePTFE fibers having a density of 1.94 g/cm³ were substituted for the ePTFE fibers. An ePTFE fiber by W.L. Gore & Associates (part number V111776, W.L. Gore & Associates, Inc., Elkton, Md.) was obtained. The ePTFE fiber measured 111 dtex and had a rectangular cross-section and possessed the following properties: width=0.5 mm, height=0.0114 mm, density=1.94 g/cm³, break strength=3.96 N, tenacity=3.58 cN/dtex, and fibril length=indeterminate (no visible nodes to define an endpoint for the fibrils). A scanning electron micrograph of the top surface of the fiber taken at 1000× magnification is shown in FIG. 6. A scanning electron micrograph of the knitted fabric taken at 80× magnification is shown in FIG. 7.

A 1×6 inch swatch of this high density ePTFE sock was subjected to the Vertical Wicking Test described above. The high density ePTFE sock exhibited wicking of 17 mm after 10 minutes.

The high density ePTFE sock was subjected to the Tissue Dampness Test described above. The change in weight of tissue associated with the high density ePTFE sock was 50%.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A fabric comprising:
a plurality of hydrophilic expanded polytetrafluoroethylene (ePTFE) fibers, each of the plurality of ePTFE fibers having a microstructure of an interconnected network of fibrils,
wherein the microstructure of the interconnected network of fibrils is configured to hold liquid therein until the liquid is evaporated from the fiber in vapor form,
wherein the liquid is at least one of water or sweat,
each of the plurality of ePTFE fibers having a density less than about 1.2 g/cm$^3$; and
a plurality of non-ePTFE fibers,
wherein the fabric has a moisture vapor transmission rate (MVTR) that is greater than about 3000 g/m$^2$/24 hours,
wherein the hydrophilic ePTFE fibers of the plurality of hydrophilic ePTFE fibers are adjacent to or surrounding the non-ePTFE fibers of the plurality of the non-ePTFE fibers in the fabric create channels, surfaces, and/or pulling forces to allow the liquid to wick via a pumping mechanism into empty air space within the microstructure of the plurality of ePTFE fibers.

2. The fabric of claim 1, wherein said fabric comprises at least 15% by weight ePTFE fibers.

3. The fabric of claim 1, wherein said ePTFE fibers have a width to height ratio greater than 1.

4. The fabric of claim 3, wherein said ePTFE fibers have a substantially rectangular cross sectional configuration.

5. The fabric of claim 1, wherein said ePTFE fibers have a width to height ratio of about 1.

6. The fabric of claim 5, wherein said ePTFE fibers have a substantially round configuration.

7. The fabric of claim 1, wherein said ePTFE fibers have incorporated therein at least one material selected from the group consisting of a colorant and a high index of refraction material.

8. The fabric of claim 1, wherein each of the plurality of ePTFE fibers including an insulative material.

9. The fabric of claim 1, wherein said fabric is selected from a woven fabric and a knit fabric.

10. The fabric of claim 1, further comprising a textile affixed to at least one side of said fabric.

11. The fabric of claim 1, further comprising a polymer membrane affixed to at least one side of said fabric.

12. The fabric of claim 1, wherein said non-ePTFE fibers are selected from the group consisting of rayon, polyester, polyethylene, polypropylene, cotton, wool, silk, aramid, polyamide, acrylic, olefin, spandex and combinations thereof.

13. A woven fabric comprising:
a plurality of warp and weft fibers, at least one of said warp fibers, at least one of said weft fibers, or at least one of said warp and said weft fibers comprising at least one hydrophilic expanded polytetrafluoroethylene (ePTFE) fiber, each hydrophilic ePTFE fiber having a microstructure of an interconnected network of fibrils,
wherein the microstructure of the interconnected network of fibrils is configured to hold liquid therein until the liquid is evaporated from the fiber in vapor form, and
wherein each hydrophilic ePTFE fiber has a density less than about 1.2 g/cm$^3$; and
a plurality of non-ePTFE fibers,
wherein the woven fabric has a moisture vapor transmission rate (MVTR) that is greater than about 3000 g/m$^2$/24 hours,
wherein each of the hydrophilic ePTFE fiber is adjacent to or surrounding the non-ePTFE fibers of the plurality of the non-ePTFE fibers in the fabric to create channels, surfaces, and/or pulling forces to allow the liquid to wick via a pumping mechanism into empty air space within the microstructure of each of the hydrophilic ePTFE fiber.

14. The fabric of claim 13, wherein said fabric comprises at least 15% by weight ePTFE fibers.

15. The fabric of claim 13, wherein said ePTFE fibers have a width to height ratio greater than 1.

16. The fabric of claim 13, wherein said ePTFE fibers have a width to height ratio of about 1.

17. The fabric of claim 13, wherein said ePTFE fibers have incorporated therein at least one material selected from the group consisting of a colorant and high index of refraction material.

18. The fabric of claim 13, wherein said ePTFE fibers have therein an insulative material.

19. The fabric of claim 13, wherein said non-ePTFE fibers are selected from the group consisting of rayon, polyester, polyethylene, polypropylene, cotton, wool, silk, aramid, polyamide, acrylic, olefin, spandex and combinations thereof.

20. A knit fabric comprising:
a plurality of hydrophilic expanded polytetrafluoroethylene (ePTFE) fibers, each of the plurality of hydrophilic ePTFE fibers having a microstructure of an interconnected network of fibrils,
wherein the microstructure of the interconnected network of fibrils is configured to hold liquid therein until the liquid is evaporated from the fiber in vapor form, and
wherein each fiber each of the plurality of hydrophilic ePTFE fibers has a density less than about 1.2 g/cm$^3$; and
a plurality of non-ePTFE fibers in a knit configuration,
wherein the knit fabric has a moisture vapor transmission rate (MVTR) that is greater than about 3000 g/m$^2$/24 hours,
wherein the hydrophilic ePTFE fibers of the plurality of hydrophilic ePTFE fibers are adjacent to or surrounding the non-ePTFE fibers of the plurality of the non-ePTFE fibers in the fabric to create channels, surfaces, and/or pulling forces to allow the liquid to wick via a pumping mechanism into empty air space within the microstructure of the plurality of ePTFE fibers.

21. The fabric of claim 20, wherein said fabric comprises at least 15% by weight ePTFE fibers.

22. The fabric of claim 20, wherein said ePTFE fibers have therein an insulative material.

23. The fabric of claim 20, wherein said ePTFE fibers have a width to height ratio greater than 1.

24. The fabric of claim 20, wherein said ePTFE fibers have a width to height ratio of about 1.

25. The fabric of claim 20, wherein said ePTFE fibers have incorporated therein at least one material selected from the group consisting of a colorant and high index of refraction material.

26. The fabric of claim 20, wherein said non-ePTFE fibers are selected from the group consisting of rayon, polyester, polyethylene, polypropylene, cotton, wool, silk, aram id, polyamide, acrylic, olefin, spandex and combinations thereof.

27. An article comprising:
hydrophilic ePTFE fibers, each hydrophilic ePTFE fiber having a microstructure of an interconnected network of fibrils;
   wherein the microstructure of the interconnected network of fibrils is configured to hold liquid therein until the liquid is evaporated from the fiber in vapor form, and non-ePTFE fibers,
   wherein said hydrophilic ePTFE fibers and said non-ePTFE fibers are formed into a fabric, and
   wherein the fabric has a moisture vapor transmission rate (MVTR) that is greater than about 3000 g/m$^2$/24 hours,
   wherein the hydrophilic ePTFE fibers are adjacent to or surrounding the non-ePTFE fibers in the fabric to create channels, surfaces, and/or pulling forces to allow the liquid to wick via a pumping mechanism into empty air space within the microstructure of the hydrophilic ePTFE fibers.

28. The article of claim 27, wherein said non-ePTFE fibers are selected from the group consisting of rayon, polyester, polyethylene, polypropylene, cotton, wool, silk, aramid, polyamide, acrylic, olefin, spandex and combinations thereof.

29. The fabric of claim 27, wherein said ePTFE fibers have incorporated therein at least one material selected from the group consisting of a colorant and high index of refraction material.

30. The article of claim 27, wherein said fabric comprises at least 15% by weight ePTFE fibers.

31. The fabric of claim 27, wherein said ePTFE fibers have therein an insulative material.

32. The fabric of claim 27, wherein said ePTFE fibers have a width to height ratio greater than 1.

33. The fabric of claim 27, wherein said ePTFE fibers have a width to height ratio of about 1.

34. A fabric comprising:
a plurality of hydrophilic conformable fluoropolymer fibers, each of the plurality of hydrophilic conformable fluoropolymer fibers having a microstructure of an interconnected network of fibrils,
   wherein the microstructure of the interconnected network of fibrils is configured to hold liquid therein until the liquid is evaporated from the fiber in vapor form, and
   wherein each of the plurality of hydrophilic conformable fluoropolymer fibers has a density less than about 1.2 g/cm$^3$; and
a plurality of other non-fluoropolymer fibers,
wherein the fabric has a moisture vapor transmission rate (MVTR) that is greater than about 3000 g/m$^2$/24 hours,
wherein the hydrophilic conformable fluoropolymer fibers of the plurality of hydrophilic conformable fluoropolymer fibers are adjacent to or surrounding the non-fluoropolymer fibers of the plurality of the non-fluoropolymer fibers in the fabric to create channels, surfaces, and/or pulling forces to allow the liquid to wick via a pumping mechanism into empty air space within the microstructure of the plurality of hydrophilic conformable fluoropolymer fibers.

* * * * *